United States Patent
Ammann

(10) Patent No.: US 8,382,436 B2
(45) Date of Patent: Feb. 26, 2013

(54) NON-INTEGRAL TURBINE BLADE PLATFORMS AND SYSTEMS

(75) Inventor: Luke J. Ammann, Greenville, SC (US)

(73) Assignee: General Electric Company, Schenectady, NY (US)

( * ) Notice: Subject to any disclaimer, the term of this patent is extended or adjusted under 35 U.S.C. 154(b) by 899 days.

(21) Appl. No.: 12/349,419

(22) Filed: Jan. 6, 2009

(65) Prior Publication Data

US 2010/0172760 A1  Jul. 8, 2010

(51) Int. Cl.
*F01D 5/30* (2006.01)
*F01D 11/00* (2006.01)

(52) U.S. Cl. .................................. 416/193 A; 416/248

(58) Field of Classification Search .............. 416/193 A, 416/248; 29/889.21
See application file for complete search history.

(56) References Cited

U.S. PATENT DOCUMENTS

| | | | |
|---|---|---|---|
| 3,563,669 A | 2/1971 | Hockert et al. |
| 3,588,269 A | 6/1971 | Wall, Jr. |
| 3,601,991 A | 8/1971 | Johnson |
| 3,604,210 A | 9/1971 | Johnson |
| 3,638,422 A | 2/1972 | Loft et al. |
| 3,639,076 A | 2/1972 | Rowen |
| 3,674,337 A | 7/1972 | Marcatili |
| 3,674,377 A | 7/1972 | Trappmann |
| 3,680,309 A | 8/1972 | Wallace, Jr. |
| 3,719,041 A | 3/1973 | Barnard et al. |
| 3,719,427 A | 3/1973 | Davis |
| 3,786,992 A | 1/1974 | Robinson |
| 3,790,298 A | 2/1974 | Hendrickson et al. |
| 3,966,352 A | 6/1976 | White et al. |
| 4,003,675 A | 1/1977 | Stevens et al. |
| 4,005,572 A | 2/1977 | Giffhorn |
| 4,025,227 A | 5/1977 | Greenberg et al. |
| 4,053,256 A | 10/1977 | Hertel |
| 4,067,661 A | 1/1978 | Gebhart et al. |
| 4,135,362 A | 1/1979 | Glenn |
| 4,145,875 A | 3/1979 | Liddle et al. |
| 4,150,915 A | 4/1979 | Karstensen |
| 4,163,629 A | 8/1979 | McDonough et al. |
| 4,169,692 A | 10/1979 | McDonough et al. |
| 4,173,121 A | 11/1979 | Yu |
| 4,187,054 A | 2/1980 | Landis, Jr. et al. |
| 4,193,738 A | 3/1980 | Landis, Jr. et al. |

(Continued)

FOREIGN PATENT DOCUMENTS

| | | |
|---|---|---|
| CA | 2603130 | 9/2007 |
| EP | 978772 | 2/2000 |

(Continued)

OTHER PUBLICATIONS

Composites; GE Energy; http://www.gepower.com/prod_serv/products/composites/en/downloads/gea13712_composite.pdf.

(Continued)

*Primary Examiner* — Chuong A Luu
*Assistant Examiner* — Nga Doan
(74) *Attorney, Agent, or Firm* — Fletcher Yoder P.C.

(57) ABSTRACT

In one embodiment, a turbine blade platform may be disposed between two turbine blades. The platform may include a first exterior side configured to interface with a first turbine blade. The platform also may include a second exterior side disposed generally opposite the first exterior side and configured to interface with a second turbine blade.

20 Claims, 5 Drawing Sheets

U.S. PATENT DOCUMENTS

| | | |
|---|---|---|
| 4,214,850 A | 7/1980 | Sato |
| 4,214,851 A | 7/1980 | Tuley et al. |
| 4,214,852 A | 7/1980 | Tuley et al. |
| 4,222,235 A | 9/1980 | Adamson et al. |
| 4,264,270 A | 4/1981 | Geary et al. |
| 4,270,344 A | 6/1981 | Yu |
| 4,406,117 A | 9/1983 | Rowen et al. |
| 4,541,567 A | 9/1985 | Jourdain et al. |
| 5,222,865 A | 6/1993 | Corsmeier |
| 5,269,139 A | 12/1993 | Klees |
| 5,273,213 A | 12/1993 | Lewis |
| 5,517,817 A | 5/1996 | Hines |
| 5,620,301 A | 4/1997 | Lawer |
| 5,630,701 A | 5/1997 | Lawer |
| 5,683,225 A | 11/1997 | Orlando et al. |
| 5,733,102 A * | 3/1998 | Lee et al. ............ 416/97 R |
| 5,768,884 A | 6/1998 | Hines |
| 5,806,052 A | 9/1998 | Bonissone et al. |
| 5,832,714 A | 11/1998 | Hines |
| 5,854,154 A | 12/1998 | Radford et al. |
| 5,911,679 A | 6/1999 | Farrell et al. |
| 5,931,636 A | 8/1999 | Savage et al. |
| 5,941,537 A | 8/1999 | Wallace et al. |
| 6,013,592 A | 1/2000 | Merrill et al. |
| 6,039,537 A | 3/2000 | Scheurlen |
| 6,092,361 A | 7/2000 | Romani |
| 6,099,252 A | 8/2000 | Manning et al. |
| 6,111,599 A | 8/2000 | Nance et al. |
| 6,190,133 B1 | 2/2001 | Ress, Jr. et al. |
| 6,197,424 B1 | 3/2001 | Morrison et al. |
| 6,235,370 B1 | 5/2001 | Merrill et al. |
| 6,287,511 B1 | 9/2001 | Merrill et al. |
| 6,305,156 B1 | 10/2001 | Lui |
| 6,324,828 B1 | 12/2001 | Willis et al. |
| 6,325,593 B1 | 12/2001 | Darkins, Jr. et al. |
| 6,332,313 B1 | 12/2001 | Willis et al. |
| 6,382,920 B1 | 5/2002 | Dopper |
| 6,387,539 B1 | 5/2002 | Subramanian |
| 6,431,833 B2 | 8/2002 | Jones |
| 6,441,341 B1 | 8/2002 | Steibel et al. |
| 6,506,016 B1 * | 1/2003 | Wang .................. 415/173.7 |
| 6,512,379 B2 | 1/2003 | Harrold et al. |
| 6,514,046 B1 | 2/2003 | Morrison et al. |
| 6,516,603 B1 | 2/2003 | Urback et al. |
| 6,517,959 B1 | 2/2003 | Beele |
| 6,528,190 B1 | 3/2003 | Campbell et al. |
| 6,602,053 B2 | 8/2003 | Subramanian et al. |
| 6,617,013 B2 | 9/2003 | Morrison et al. |
| 6,641,907 B1 | 11/2003 | Merrill et al. |
| 6,648,597 B1 | 11/2003 | Widrig et al. |
| 6,670,026 B2 | 12/2003 | Steibel et al. |
| 6,670,046 B1 | 12/2003 | Xia |
| 6,676,783 B1 | 1/2004 | Merrill et al. |
| 6,677,064 B1 | 1/2004 | Subramanian |
| 6,682,300 B2 | 1/2004 | Bolms |
| 6,703,137 B2 | 3/2004 | Subramanian |
| 6,709,230 B2 | 3/2004 | Morrison et al. |
| 6,733,907 B2 * | 5/2004 | Morrison et al. ............ 428/699 |
| 6,746,755 B2 | 6/2004 | Morrison et al. |
| 6,751,940 B1 | 6/2004 | Paul |
| 6,755,619 B1 * | 6/2004 | Grylls et al. .................. 416/224 |
| 6,758,653 B2 | 7/2004 | Morrison |
| 6,767,659 B1 | 7/2004 | Campbell |
| 6,838,157 B2 | 1/2005 | Subramanian |
| 6,878,041 B2 | 4/2005 | Esser et al. |
| 6,884,384 B2 | 4/2005 | Merrill et al. |
| 6,913,440 B2 | 7/2005 | Ciacci et al. |
| 6,929,852 B2 | 8/2005 | Lane et al. |
| 6,938,404 B2 | 9/2005 | Awdalla |
| 6,939,603 B2 | 9/2005 | Oechsner |
| 6,977,060 B1 | 12/2005 | Merrill et al. |
| 6,981,841 B2 | 1/2006 | Krammer et al. |
| 6,984,112 B2 | 1/2006 | Zhang et al. |
| 6,984,277 B2 | 1/2006 | Morrison et al. |
| 7,001,679 B2 | 2/2006 | Campbell et al. |
| 7,017,415 B2 | 3/2006 | Harrold et al. |
| 7,044,709 B2 | 5/2006 | Bruce et al. |
| 7,057,176 B2 | 6/2006 | Rothenfusser et al. |
| 7,066,717 B2 | 6/2006 | Morrison et al. |
| 7,067,181 B2 | 6/2006 | Burke |
| 7,067,447 B2 | 6/2006 | Campbell |
| 7,080,513 B2 | 7/2006 | Reichert |
| 7,093,359 B2 | 8/2006 | Morrison et al. |
| 7,123,031 B2 | 10/2006 | Twerdochlib |
| 7,153,096 B2 | 12/2006 | Thompson et al. |
| 7,176,681 B2 | 2/2007 | Zombo |
| 7,179,524 B2 | 2/2007 | Merrill et al. |
| 7,182,580 B2 | 2/2007 | Bostanjoglo et al. |
| 7,182,581 B2 | 2/2007 | Bostanjoglo et al. |
| 7,198,458 B2 | 4/2007 | Thompson |
| 7,198,462 B2 | 4/2007 | Merrill et al. |
| 7,198,860 B2 | 4/2007 | Vance |
| 7,217,088 B2 | 5/2007 | Albrecht et al. |
| 7,223,465 B2 | 5/2007 | Subramanian et al. |
| 7,229,254 B2 | 6/2007 | Bast et al. |
| 7,230,205 B2 | 6/2007 | Twerdochlib |
| 7,237,389 B2 | 7/2007 | Ryan et al. |
| 7,238,002 B2 | 7/2007 | Cairo et al. |
| 7,247,002 B2 | 7/2007 | Albrecht et al. |
| 7,247,003 B2 | 7/2007 | Burke et al. |
| 7,250,776 B2 | 7/2007 | Twerdochlib |
| 7,258,530 B2 | 8/2007 | Morrison et al. |
| 7,270,890 B2 | 9/2007 | Sabol et al. |
| 7,278,820 B2 | 10/2007 | Keller |
| 7,291,407 B2 | 11/2007 | Merrill et al. |
| 7,300,621 B2 | 11/2007 | Merrill |
| 7,306,826 B2 | 12/2007 | Subramanian et al. |
| 7,311,790 B2 | 12/2007 | Morrison et al. |
| 7,316,539 B2 | 1/2008 | Campbell |
| 7,326,030 B2 | 2/2008 | Albrecht et al. |
| 7,329,087 B2 | 2/2008 | Cairo et al. |
| 7,334,330 B2 | 2/2008 | Vance |
| 7,341,428 B2 | 3/2008 | Twerdochlib |
| 7,351,364 B2 | 4/2008 | Morrison et al. |
| 7,371,043 B2 | 5/2008 | Keller |
| 7,387,758 B2 | 6/2008 | Merrill et al. |
| 7,393,183 B2 | 7/2008 | Keller |
| 7,402,347 B2 | 7/2008 | Morrison et al. |
| 7,434,670 B2 | 10/2008 | Good et al. |
| 7,931,442 B1 * | 4/2011 | Liang .................. 416/193 A |
| 2003/0207155 A1 | 11/2003 | Morrison et al. |
| 2005/0064245 A1 | 3/2005 | Campbell |
| 2005/0158171 A1 | 7/2005 | Carper et al. |
| 2005/0186069 A1 | 8/2005 | Subramanian et al. |
| 2005/0198967 A1 | 9/2005 | Subramanian |
| 2005/0235493 A1 | 10/2005 | Philip et al. |
| 2005/0241318 A1 | 11/2005 | Buehman et al. |
| 2005/0254942 A1 | 11/2005 | Morrison et al. |
| 2005/0287386 A1 | 12/2005 | Sabol et al. |
| 2006/0019087 A1 | 1/2006 | Mazzola et al. |
| 2006/0056959 A1 | 3/2006 | Sabol et al. |
| 2006/0056960 A1 | 3/2006 | Sabol et al. |
| 2006/0140768 A1 * | 6/2006 | Tam et al. ................. 416/193 A |
| 2006/0225432 A1 | 10/2006 | Awdalla |
| 2006/0228211 A1 | 10/2006 | Vance et al. |
| 2006/0245984 A1 | 11/2006 | Kulkarni et al. |
| 2006/0283014 A1 | 12/2006 | Subramanian et al. |
| 2006/0284337 A1 | 12/2006 | Subramanian et al. |
| 2006/0292001 A1 | 12/2006 | Keller et al. |
| 2007/0018670 A1 | 1/2007 | Ito et al. |
| 2007/0031258 A1 | 2/2007 | Campbell et al. |
| 2007/0048144 A1 | 3/2007 | Morrison et al. |
| 2007/0065285 A1 | 3/2007 | Cairo et al. |
| 2007/0072007 A1 | 3/2007 | Carper et al. |
| 2007/0075455 A1 | 4/2007 | Marini et al. |
| 2007/0082201 A1 | 4/2007 | Subramanian et al. |
| 2007/0096371 A1 | 5/2007 | McGuigan et al. |
| 2007/0098546 A1 | 5/2007 | Cairo et al. |
| 2007/0128447 A1 | 6/2007 | Hazel et al. |
| 2007/0140835 A1 | 6/2007 | Albrecht et al. |
| 2007/0141367 A1 | 6/2007 | Darolia et al. |
| 2007/0141369 A1 | 6/2007 | Hazel et al. |
| 2007/0147996 A1 | 6/2007 | Campbell |
| 2007/0172676 A1 | 7/2007 | Burns et al. |
| 2007/0189901 A1 * | 8/2007 | Dundas et al. ............ 416/223 A |
| 2007/0196693 A1 | 8/2007 | Steibel et al. |
| 2007/0237630 A1 | 10/2007 | Schiavo, Jr. et al. |

| | | | |
|---|---|---|---|
| 2007/0237667 A1 | 10/2007 | Merrill et al. | |
| 2007/0240423 A1 | 10/2007 | Bulman et al. | |
| 2007/0258809 A1 | 11/2007 | Mazzola et al. | |
| 2007/0275210 A1 | 11/2007 | Heselhaus | |
| 2008/0005854 A1 | 1/2008 | Fernandez Cid et al. | |
| 2008/0025838 A1 | 1/2008 | Marini et al. | |
| 2008/0025842 A1 | 1/2008 | Marini et al. | |
| 2008/0025846 A1 | 1/2008 | Vance et al. | |
| 2008/0087021 A1 | 4/2008 | Radonovich et al. | |
| 2008/0101683 A1 | 5/2008 | Zombo et al. | |
| 2008/0107521 A1 | 5/2008 | Morrison et al. | |
| 2008/0116614 A1 | 5/2008 | Morrison et al. | |
| 2008/0124512 A1 | 5/2008 | Steibel et al. | |
| 2008/0131699 A1 | 6/2008 | Vance | |
| 2008/0179465 A1 | 7/2008 | Cros | |
| 2008/0181766 A1 | 7/2008 | Campbell et al. | |
| 2008/0199307 A1 | 8/2008 | Keller | |
| 2008/0199661 A1 | 8/2008 | Keller et al. | |
| 2008/0202877 A1 | 8/2008 | Good et al. | |
| 2008/0203236 A1 | 8/2008 | Mazzola et al. | |
| 2008/0206542 A1 | 8/2008 | Vance et al. | |
| 2008/0207075 A1 | 8/2008 | Merrill et al. | |

FOREIGN PATENT DOCUMENTS

| | | |
|---|---|---|
| EP | 1126221 | 8/2001 |
| EP | 1277918 | 1/2003 |
| EP | 1318215 | 6/2003 |
| EP | 1329592 | 7/2003 |
| EP | 1528343 | 5/2005 |
| EP | 1739356 | 1/2007 |
| EP | 1787967 | 5/2007 |
| EP | 1884714 | 2/2008 |
| EP | 1903184 | 3/2008 |
| WO | WO 9936688 | 7/1999 |
| WO | WO 9948837 | 9/1999 |
| WO | WO 0052307 | 9/2000 |
| WO | WO 0146084 | 6/2001 |
| WO | WO 0164250 | 9/2001 |
| WO | WO 0218674 | 3/2002 |
| WO | WO 02092536 | 11/2002 |
| WO | WO 2005043058 | 5/2005 |
| WO | WO 2005070613 | 8/2005 |
| WO | WO 2006040220 | 4/2006 |
| WO | WO 2006040235 | 4/2006 |
| WO | WO 2006121570 | 11/2006 |
| WO | WO 2007014005 | 2/2007 |
| WO | WO 2007025842 | 3/2007 |
| WO | WO 2007145607 | 12/2007 |
| WO | WO 2008091289 | 7/2008 |

OTHER PUBLICATIONS

Search Report and Written Opinion from EP Application No. 09180042.5 dated Oct. 18, 2012.

* cited by examiner

NON-INTEGRAL TURBINE BLADE PLATFORMS AND SYSTEMS

BACKGROUND OF THE INVENTION

The subject matter disclosed herein relates to gas turbine engines, and more specifically, to platforms for turbine blades.

In general, gas turbine engines combust a mixture of compressed air and fuel to produce hot combustion gases. The combustion gases may flow through one or more stages of turbine blades to generate power for a load and/or a compressor. Platforms between the turbine blades may provide a thermal barrier between the hot combustion gases and the turbine wheel and may define an inner flow path of the gas turbine. Due to the high temperatures within the turbine and the motive forces exerted by the combustion gases, the platforms may need to be designed to withstand high temperatures and stresses.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a turbine blade platform with a first exterior side and a second exterior side. The first exterior side is configured to interface with a first turbine blade disposed at a first angular position. The second exterior side is disposed generally opposite to the first exterior side and configured to interface with a second turbine blade disposed at a second angular position.

In another embodiment, a system includes a plurality of turbine blades circumferentially spaced about an axis and at least one turbine blade platform disposed between and supported by first and second turbine blades of the plurality of turbine blades. The at least one turbine blade platform partially encircles each of the first and second turbine blades.

In yet another embodiment, a method of assembling a turbine rotor includes: positioning turbine blades into openings disposed circumferentially about a rotor wheel, positioning turbine blade platforms between each of the turbine blades, inserting the turbine blades into the rotor wheel to secure the turbine blades within the rotor wheel, and setting the turbine blade platforms towards the rotor wheel such that each of the turbine blade platforms interfaces with an adjacent turbine blade platform to encompass one of the turbine blades.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
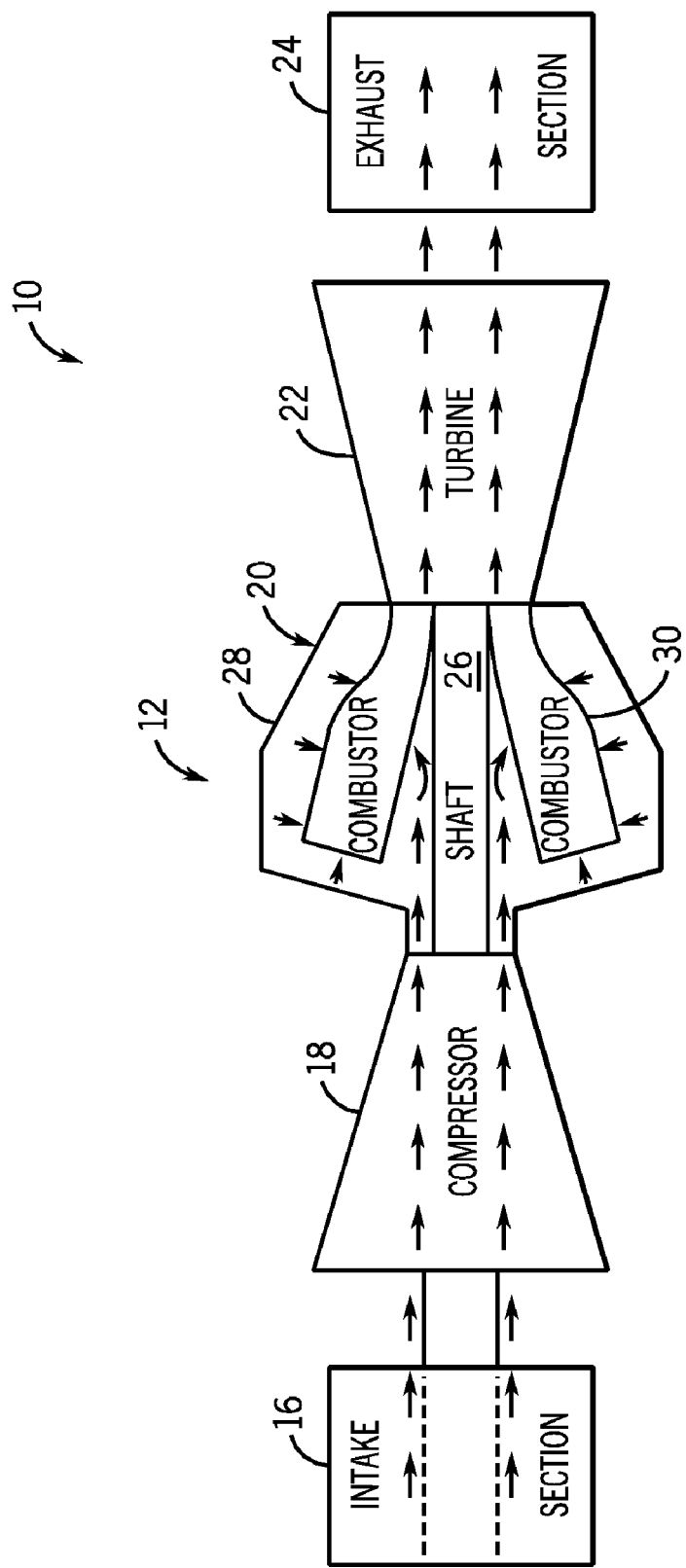
FIG. 1 is a schematic flow diagram of an embodiment of a gas turbine engine that may employ turbine blade platforms.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to gas turbine engines that include turbine blade platforms designed to withstand high temperatures and/or stresses. As the temperature of combustion gases flowing within gas turbines increases, the temperature difference between the turbine blades and platforms may increase, which in turn may exert stresses on the platforms. Traditional cooling schemes for integral blades and platforms may diminish temperature effects, but may also degrade turbine performance. Therefore, in accordance with certain embodiments, each platform may exist as a separate component from the turbine rotor blades, rather than as a single structure incorporating both the turbine rotor blade and the platform. The non-integral platforms may allow separate temperature profiles to exist for the turbine blades and platforms, which may reduce stresses on both the platforms and the turbine blades. Further, the non-integral platforms may facilitate a reduction in cooling, which in turn may increase the efficiency of the gas turbine engine.

Each platform may be disposed between two turbine rotor blades and supported by the adjacent turbine rotor blades. Further, each platform may interface with an adjacent platform at the location of a turbine rotor blade. As two platforms are brought together, the platforms may form an opening for the turbine rotor blade, thereby allowing the platforms to encircle a turbine rotor blade and form an interface at the turbine rotor blade location. The placement of the platform interface at the turbine rotor blades (instead of between the turbine rotor blades) may relieve stresses exerted on the platforms during operation. In certain embodiments, the turbine blade platforms may be constructed of ceramic matrix composites (CMCs). The CMC material may allow the platforms to withstand high temperatures and maintain their shape during operation. In other embodiments, the turbine blade platforms may be constructed or comprised of a metal, metal alloy, such as a nickel-based superalloy, or other suitable material. Further, the non-integral platforms may allow different materials to be used for the platforms and turbine blades. For example, in certain embodiments, the platforms may be constructed of CMCs while the turbine blades are construed of nickel based superalloys.

FIG. 1 is a block diagram of an exemplary system 10 including a gas turbine engine 12 that may employ platforms designed to interface at or near the turbine rotor blades. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is drivingly coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 30 where the compressed air may mix and combust with fuel within the combustors 30 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24.

Figure 2:
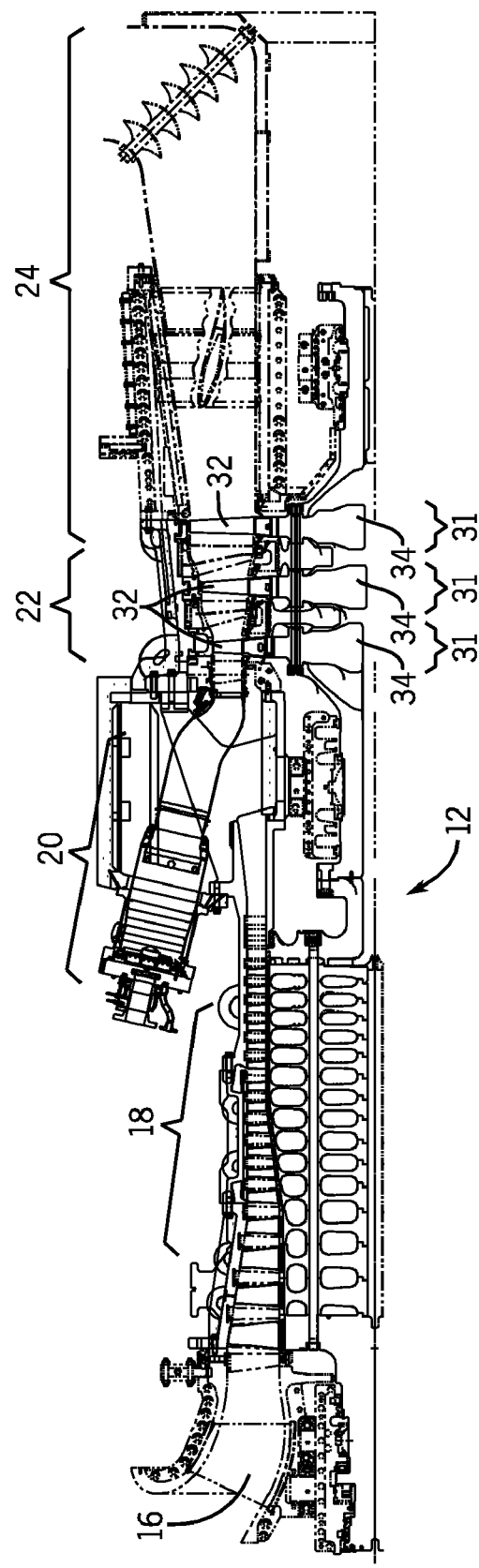
FIG. 2 is a sectional view of the gas turbine engine of FIG. 1 sectioned through the longitudinal axis.

FIG. 2 is a side view of an embodiment of the gas turbine engine 12 of FIG. 1 taken along the longitudinal axis. As depicted, the gas turbine 22 includes three separate turbine rotors 31. Each rotor 31 includes a rotor assembly 32 coupled to a rotor wheel 34 that may be rotatably attached to the shaft 26 (FIG. 1). The rotor assemblies 32 may include blades that extend radially outward from the rotor wheels 34 and may be partially disposed within the path of the hot combustion gases. As discussed further below, the rotor assemblies 32 may include the turbine blades and the turbine blade platforms. Although the gas turbine 22 is illustrated as a three-stage turbine with three rotors 31, the turbine blade platforms described herein may be employed in any suitable type of turbine with any number of stages and shafts. For example, the platforms may be included in a single stage gas turbine, in a dual turbine system that includes a low-pressure turbine and a high-pressure turbine, or in a steam turbine.

As described above with respect to FIG. 1, air may enter through the air intake section 16 and be compressed by the compressor 18. The compressed air from the compressor 18 may then be directed into the combustor section 20 where the compressed air may be mixed with fuel gas. The mixture of compressed air and fuel gas is generally burned within the combustor section 20 to generate high-temperature, high-pressure combustion gases, which may be used to generate torque within the turbine 22. Specifically, the combustion gases may apply motive forces to the rotor assemblies 32 to turn the wheels 34, thereby subjecting the rotor assemblies 32 to various mechanical loads and/or stresses. For example, the combustion gases may exert motive forces on the turbine blades within the rotor assemblies 32. Variations in the motive forces may cause vibrations, which may exert stress on the rotor assemblies 32. Further, internal temperatures may reach approximately 650° C. or higher which may make the components susceptible to corrosion, oxidation, creep, and/or fatigue. Accordingly, the platforms of the rotor assemblies 32 may be comprised or constructed of CMCs to provide higher temperature capabilities. Moreover, the isolation of the platforms from the turbine blades may reduce thermal stresses in the blades and/or platforms due to thermal gradients between the blades and platforms. The reduced thermal stresses may facilitate construction with CMCs.

Figure 3:
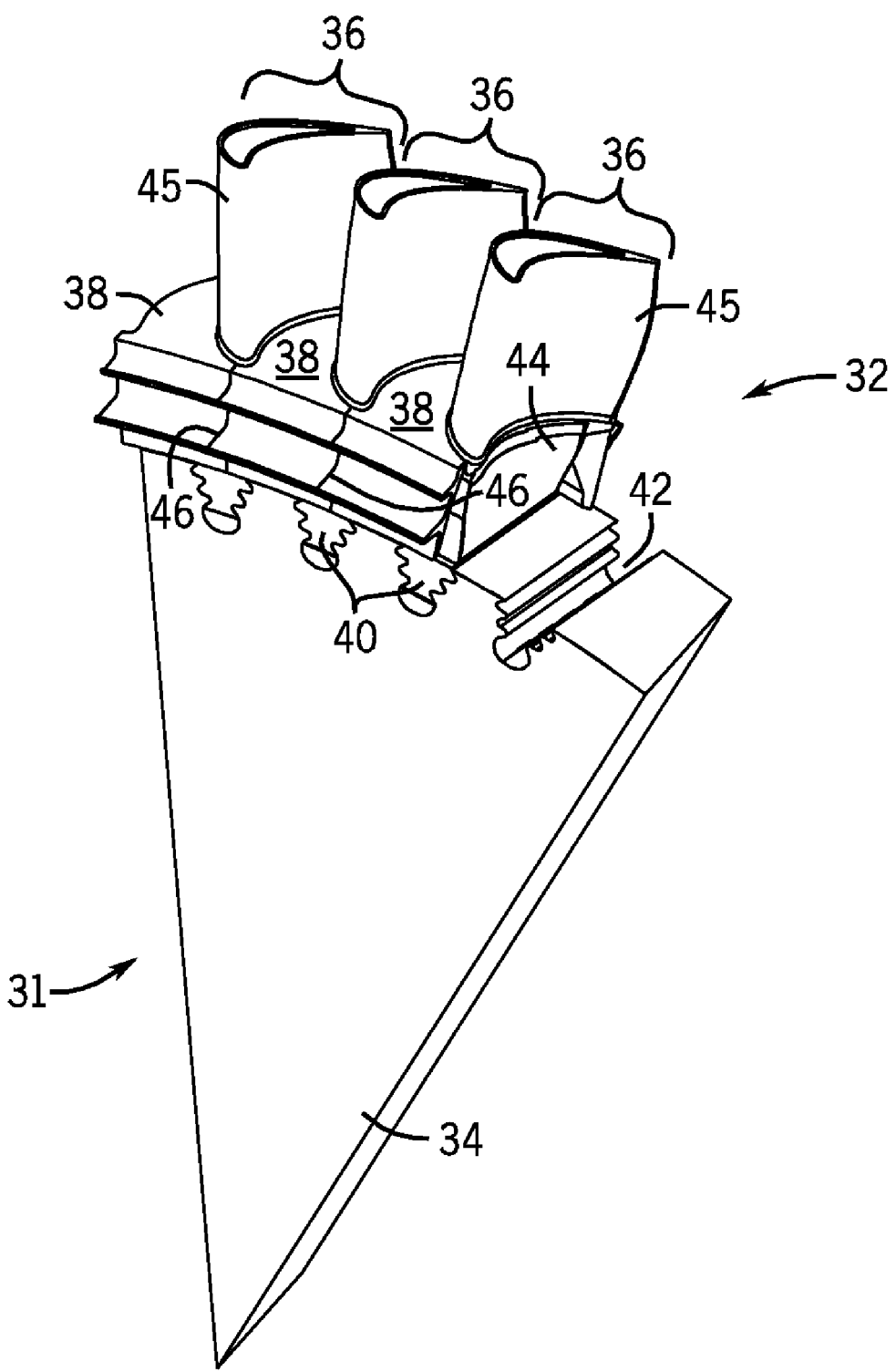
FIG. 3 is perspective view of an embodiment of the rotor wheels shown in FIG. 2.

FIG. 3 is a perspective view of a portion of one of the rotor wheels 31 shown in FIG. 2. For illustrative purposes, only a portion of the rotor wheel 31 is illustrated. However, the wheel 31 may generally include a circular structure with rotor assemblies 32 extending radially outward along the circumference of the wheel. The rotor assemblies 32 include turbine blades 36 and turbine blade platforms 38 that may be collectively known as the rotor assemblies 32. In certain embodiments, approximately 60 to 92 rotor assemblies 32 may be mounted and spaced circumferentially around the wheel 34 and a corresponding axis of rotation.

The blades 36 and platforms 38 of the rotor assemblies 32 may be constructed of a metal, metal alloy, CMC, or other suitable material. Each blade 36 includes a dovetail 40 that may be inserted into corresponding openings 42 within the rotor wheel 34. The openings 42 may be circumferentially spaced at angular positions around the rotor wheel 34. The blade 36 also includes a shank 44 extending radially outward from the dovetail 40. In certain embodiments, the blade 36 may include a contour, ledge, or other support structure, for supporting the platforms 38. For example, the contour may be located on the shank 44 or on an airfoil 45 extending radially outward from the shank 44. The airfoils 45 may be disposed within the path of the hot combustion gases. In operation, the hot combustion gases may exert motive forces on the airfoils 45 to drive the turbine 22 (FIG. 1).

The platforms 38 may be disposed generally between the shanks 44 of the blades 36 and may be radially positioned between the openings 42 within the rotor wheel 34. The blades 36 extend radially outward from the wheel 34 and are circumferentially spaced around the wheel 34 to create spaces between the blades 36. The platforms 38 may be positioned in these circumferential spaces between the blades 36. In other words, the platforms 38 are not merely integral extensions of the blades 36, but rather the platforms 38 fill the spaces, or a portion of the spaces, separating the blades 36 that extend at radial positions from the wheel 34. Further, the platforms 38 may be substantially disposed between the blades 36 so the majority of each platform 38 is located between the same two adjacent blades 36. For example, at least approximately 60, 70, 80, 90, or 100 percent, and all subranges therebetween, may be located between the same two adjacent blades 36. The platforms 38 may extend between the shanks 44, the airfoils 45, the dovetails 40, or combinations thereof. In certain embodiments, the platforms 38 may be mounted and supported by contours located on the shanks 44. In other embodiments, the platforms 38 may be supported by the sides of the blades 36. The platforms 38 also may include integral skirts or cover plates extending from the sides of the shanks.

As noted above, the platforms 38 may exist as independent and/or separate components from the blades 36. In other words, the platforms 38 are not integral with the blades 36. In certain embodiments, the platforms 38 may be cast or otherwise formed of CMC materials. The separate component construction of the platforms 38 may allow long and continuous ceramic fibers to be employed in the CMC material. In certain embodiments, the platforms 38 may constructed substantially of or entirely of CMCs. For example, the platforms 38 may be comprised or constructed of at least approximately 50, 60, 70, 80, 90, or 100 percent CMC material. In other embodiments, the platforms 38 may be constructed of a metal, metal alloy, or other suitable material with a CMC coating or layer.

The CMC materials may include any suitable type of fiber reinforced ceramic material. For example, the CMC material may include fiber reinforced non-oxide ceramics, such as silicon carbide, silicon nitride, boron carbide, and aluminum nitride. The CMC material also may include fiber reinforced oxide matrix ceramics, such as alumina, silica, mullite, barium aluminosilicate, lithium aluminosilicate, or calcium aluminosilicate. The CMC materials may include any suitable type of oxide or non-oxide reinforcing fibers, such as silicon carbide, carbon, glass, mullite, alumina, or combinations thereof. For example, the CMC materials may include a silicon carbide fiber-silicon carbide matrix, a glass fiber-silicon nitride matrix, or other suitable CMC. As noted above the CMC material may provide higher temperature capabilities and may function to reduce stresses on the platform 38. For example, in certain embodiments, a silicon carbide fiber-silicon carbide matrix CMC component may be capable of withstanding temperatures from approximately 1204° C. to approximately 1316° C. In another example, a carbon fiber-silicon carbide matrix CMC component may be capable of withstanding temperatures from approximately 1538° C. to approximately 2482° C.

The location of the interfaces 46 between the platforms 38 also may reduce stresses on the platforms 38. As noted above, the interfaces 46 are located at the angular positions of the blades 36 rather than at the intermediate angular positions midway between the blades 36. The platforms 38 are generally designed to create openings for the blades 36 when joined together at an interface 46. Specifically, each side of the platform 38 may include an opening for a portion of the turbine blade 36. When two platforms 38 are positioned adjacent to each other, the platforms 38 may form an opening corresponding to the profile of a turbine blade 36. In other words, each platform 38 alone does not include an opening for encompassing the entire perimeter of a turbine blade 36. Instead, each platform 38 has partial openings for a turbine blade 36 that when interfaced with partial openings of an adjacent platform 38 form an opening that may encircle a turbine blade 36. In this manner, the interfaces 46 between the platforms 38 are disposed adjacent to or near the turbine blades 36. The location of the interfaces 46 on the turbine blades 36 may reduce or eliminate leakage of combustion gases and/or cooling fluids between the shanks 44 of the blades 36. In certain embodiments, the platforms 38 may be disposed against each other. However, in other embodiments, the platforms 38 may include attachment mechanisms such as connectors, tabs, seals, and the like for connecting one platform 38 to another.

The platforms described herein may be used with many types and configurations of platforms and turbine blades. For example, the profile, shapes, and relative sizes, of the blades 36 and platforms 38 may vary. In certain embodiments, the blades 36 may have integral cooling passages and/or may be coated, for example, with CMCs, an overlay coating, a diffusion coating, or other thermal barrier coating, to prevent hot corrosion and high temperature oxidation. Further, the blades 36 may include tip shrouds extending radially from the airfoils 45 may to provide vibration control. The platforms 38 may include additional components, such as sealing structures, that may be integrally cast with the platforms 38 or attached as separate components to the platforms 38. Further, seal pins may be disposed against the platforms 38 to seal the shanks 44 from the hot combustion gases.

Figure 4:
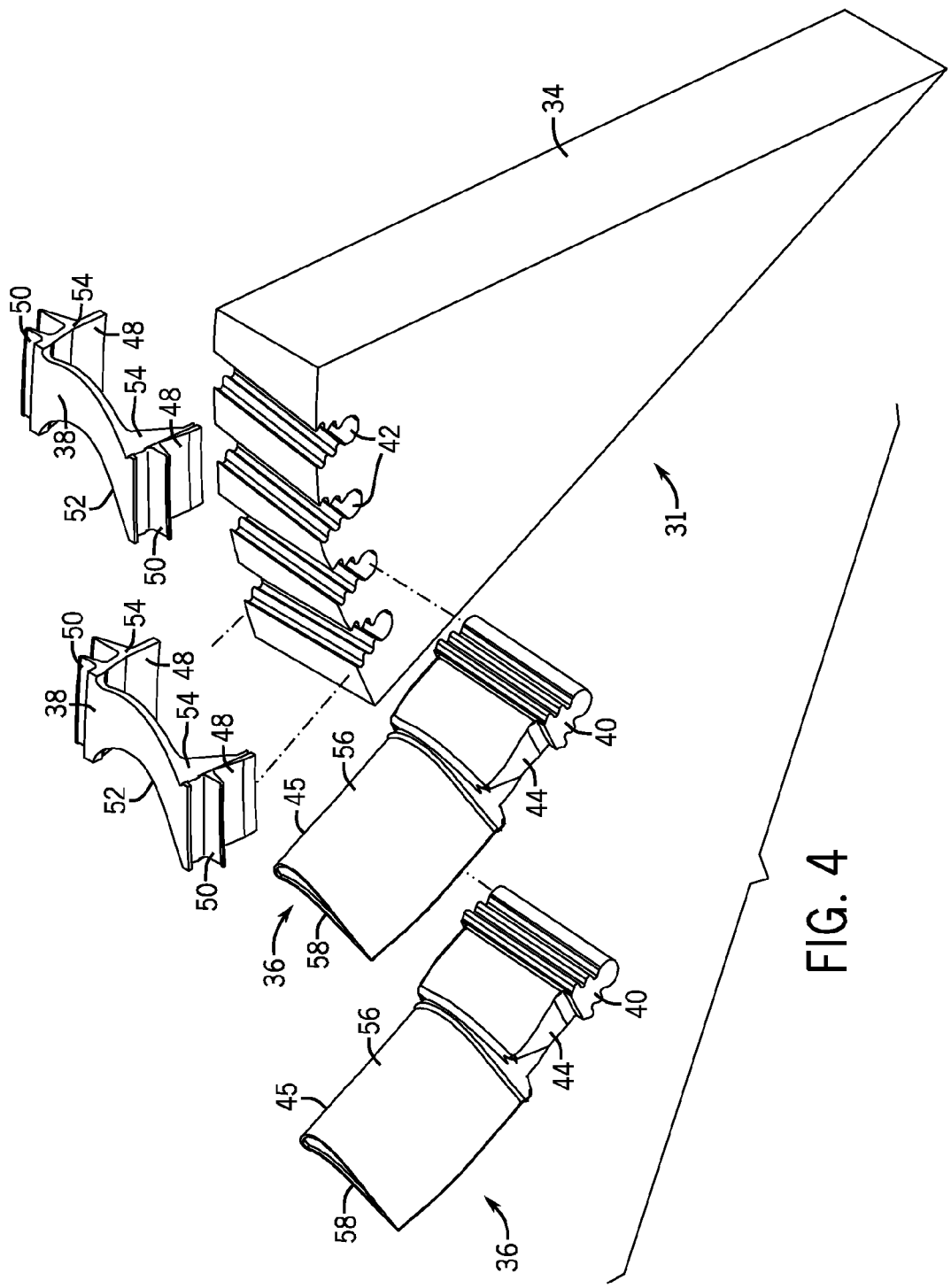
FIG. 4 is an exploded view of the rotor wheel shown in FIG. 3.

FIG. 4 is an exploded view of the rotor wheel 31 shown in FIG. 3. Each platform 38 may include two integral skirts or cover plates 48 configured to seal the shanks 44 of the blades 36 from the wheel space cavities. In certain embodiments, the integral cover plates 48 may be disposed on opposite sides of the platform 38. The platforms 38 also may include angel wings 50 configured to provide sealing of the wheel space cavities. In certain embodiments, the skirts 48 and angel wings 50 may be integrally cast with the platforms 38 and constructed of CMCs. However, in other embodiments, the skirts 48 and/or angel wings 50 may be constructed of other materials and may exist as separate components. Further, the skirts 48 and/or angel wings 50 may be omitted.

Each platform 38 includes two exterior sides 52 and 54 disposed generally opposite to each other that generally conform to the contours of the turbine blade 36. Specifically, the exterior side 52 may be designed to interface with a suction side 56 of the turbine blade 36. The exterior side 54 may be designed to interface with a pressure side 58 of a turbine blade. As shown, the exterior side 52 includes a generally concave surface designed to conform to a generally convex profile of the suction side 56 of the turbine blade 36. The exterior side 54 includes a generally convex surface designed to conform to a generally concave profile of the pressure side 58 of the turbine blade 36. When positioned around the rotor wheel 34, the exterior side 52 may interface with a suction side 56 of one turbine blade 36 located at an angular position on the wheel 34. The other exterior side 54 may interface with a pressure side 58 of another turbine blade 36 that is located at an adjacent angular position on the wheel 34. The suction side 56 of one turbine blade 36 may be contiguous with the exterior side 52 of one platform 38, and the pressure side 58 may be contiguous with the exterior side 54 of another platform 38. As may be appreciated, in other embodiments, the profiles of the exterior sides 52 and 54 may vary to conform to a variety of turbine blade profiles. For example, each exterior side 52 and 54 may have a convex, concave, flat, or other suitable geometry. As noted above, a platform 38 may be generally supported on the sides 52 and 54 by the turbine blades 36. In certain embodiments, the support from the adjacent blades 36 may reduce stresses on the platform and may reduce platform creep.

Each platform 38 may be designed to interface with an adjacent, similar platform 38 to form an intermediate opening designed to encircle or encompass a turbine blade 36. Specifically, the surface 52 may form one portion of the opening and the surface 54 may form another portion of the opening. When two platforms 38 are disposed adjacent to each other, the interface 46 (FIG. 3) between the two platforms may occur at the location of the opening for the turbine blade 36. As noted above, the location of the interface 46 may relieve stresses on the platform 38 and may reduce the leakage of fluids between the shanks 44 of the turbine blades 36.

Figure 5:
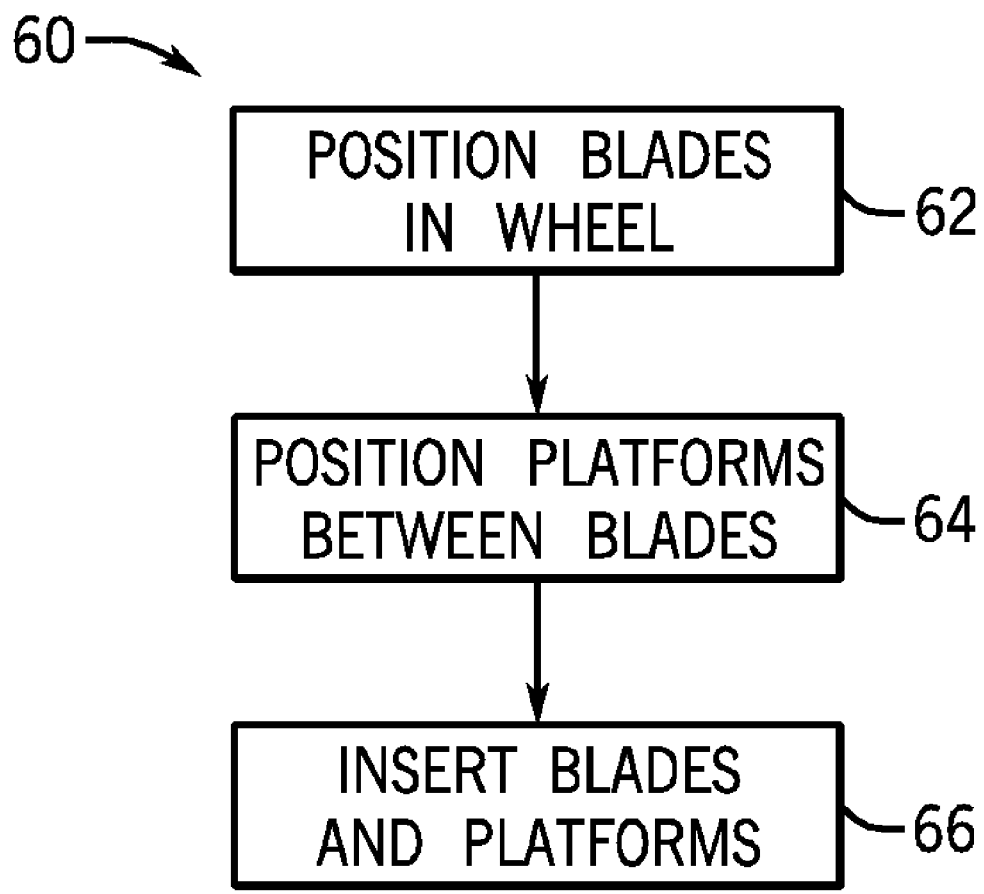
FIG. 5 is a flow chart depicting a method for assembling an exemplary rotor wheel.

FIG. 5 depicts an exemplary method 60 for assembling a rotor wheel 31. The method 60 may begin by positioning (block 62) turbine blades 36 (FIG. 4) into the rotor wheel 34 at a shallow depth. For example, the dovetails 40 (FIG. 4) of the turbine blades 36 may be partially inserted, for example to a depth of approximately 0.1 inches, within the openings 42 (FIG. 4) of the wheel 34. In other embodiments, the blades 36 may be inserted to a depth ranging from approximately 0.001 inches to 0.5 inches, and all subranges therebetween. More specifically, the blades 36 may be inserted to a depth of approximately 0.05 inches to 0.25 inches.

After one or more blades 36 have been positioned in the wheel 34, the platforms 38 may be positioned (block 64) adjacent to the blades 36. For example, one side 52 (FIG. 4) of a platform 38 may be aligned with a suction side 56 of a turbine blade 36 while a side 54 of another platform is aligned with the pressure side 58 of the same turbine blade 36. Thus, a turbine blade 36 may be disposed between two adjacent platforms 38. The adjacent platforms 38 may be held in place while additional turbine blades 36 are inserted into the wheel next to the adjacent platforms 38. In this manner, blades 36 and platforms 38 may be alternately positioned within the rotor wheel 31 until all the blades 36 and platforms 38 have been installed. In other embodiments, all the blades 36 may be partially inserted and held in place while the platforms 38 are positioned between the blades 36.

After the blades 36 and platforms 38 have been positioned in the wheel 34, the platforms 38 and the blades 36 may be inserted (block 66) into the wheel 34. For example, the blades 36 may be hammered, or otherwise inserted, farther into the wheel openings 42 to secure the blades 36 to the wheel 34. The platforms 38 also may be inserted farther toward the wheel 34 to interface with adjacent platforms 38 and encircle the turbine blades 36. In certain embodiments, the insertion process may include inserting an adjacent blade 36 and platform 38 a small increment farther into the wheel 34. The insertion process may progress circumferentially around the wheel in small increments until all of the platforms 38 and blades 36 have been fully inserted into the wheel 34.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a first turbine blade platform, comprising:
a first exterior side contoured to interface with a first airfoil of a first turbine blade disposed at a first angular position; and
a second exterior side disposed generally opposite the first exterior side and contoured to interface with a second airfoil of a second turbine blade disposed at a second angular position, wherein the first turbine blade platform is configured to be held in place by respective contours of the first airfoil and the second airfoil and without directly fastening to a rotor wheel.

2. The system of claim 1, wherein the first turbine blade platform comprises a ceramic matrix composite material.

3. The system of claim 1, wherein the first turbine blade platform comprises an attachment mechanism configured to attach the first side of the turbine blade platform to an adjacent turbine blade platform.

4. The system of claim 1, wherein the first turbine blade platform comprises:
a pair of integral cover plates disposed generally opposite to each other and generally transverse to the first and second exterior sides; and
integral angel wings disposed on the integral cover plates.

5. The system of claim 1, comprising a second turbine blade platform adjoining the first exterior side of the first turbine blade platform, wherein the second turbine blade platform comprises a third exterior side facing the first exterior side and wherein the third exterior side and the first exterior side form an airfoil opening configured to encircle the first airfoil of the turbine blade.

6. The system of claim 1, comprising a plurality of turbine blade platforms disposed in a circumferential arrangement to define a plurality of intermediate openings configured to encircle airfoils of turbine blades, wherein each pair of adjacent turbine blade platforms has opposing exterior sides that are contoured to the airfoil of the turbine blade in the intermediate opening.

7. The system of claim 6, comprising the rotor wheel, wherein the rotor wheel comprises a plurality of circumferentially spaced openings configured to receive the turbine blades at angular positions around the rotor wheel, wherein the plurality of turbine blade platforms are radially positioned between the circumferentially spaced openings.

8. The system of claim 1, comprising a rotor, a turbine, a turbine engine, a compressor, a combustor, or combinations thereof.

9. A system, comprising:
a plurality of turbine blades circumferentially spaced about an axis; and
at least one turbine blade platform disposed between, removably coupled to, and supported by first and second turbine blades of the plurality of turbine blades, wherein the at least one turbine blade platform is contoured to interface with respective airfoils of each of the first and second turbine blades, and wherein the at least one turbine blade platform is configured to be retained between the first and second turbine blades by respective contours formed in the first and second turbine blades and without directly fastening to a rotor wheel.

10. The system of claim 9, wherein each of the plurality of turbine blades comprises a concave pressure side and a convex suction side, and the at least one turbine blade platform comprises a convex exterior side contiguously disposed on the concave pressure side of the first turbine blade and a concave exterior side contiguously disposed on the convex suction side of the second turbine blade.

11. The system of claim 9, wherein each of the plurality of turbine blades comprises an airfoil, a shank, and a dovetail.

12. The system of claim 9, wherein each of the plurality of turbine blades comprises a contour configured to interface with the at least one turbine blade platform.

13. The system of claim 9, wherein the at least one turbine blade platform comprises a ceramic matrix composite and each of the plurality of turbine blades comprise a metal.

14. The system of claim 9, wherein the at least one turbine blade platform comprises:
a first side configured to generally conform to a suction side of the turbine blades; and
a second side configured to generally conform to a pressure side of the turbine blades.

15. The system of claim 9, comprising a plurality of turbine blade platforms disposed between and interfacing with each of the plurality of turbine blades.

16. The system of claim 9, comprising a turbine engine having the turbine blades and the at least one turbine blade platform.

17. A method, comprising:
positioning turbine blades into openings disposed circumferentially about a rotor wheel;
positioning turbine blade platforms between each of the turbine blades; the turbine blade platforms are separate from, and circumferentially between, the turbine blades;
inserting the turbine blades into the rotor wheel to secure the turbine blades within the rotor wheel; and
setting the turbine blade platforms towards the rotor wheel such that each of the turbine blade platforms interfaces with an adjacent turbine blade platform to encompass one of the turbine blades and each of the turbine blade platforms is held in place by respective contours formed in adjacent turbine blades and without directly fastening to the rotor wheel.

18. The method of claim 17, wherein positioning turbine blades comprises partially inserting dovetails of the turbine blades into the openings.

19. The method of claim 17, wherein positioning turbine blade platforms comprises interfacing the turbine blade platforms with the turbine blades such that each of the turbine blade platforms is supported on opposite sides by the turbine blades.

20. The method of claim 17, wherein positioning turbine blade platforms comprises aligning a contoured side of the turbine blade platform with a turbine blade, wherein the contoured side interfaces with the turbine blade.

* * * * *